Aug. 1, 1944.    M. A. EDWARDS ET AL    2,354,911
FURNACE CONTROL SYSTEM
Filed Aug. 31, 1943
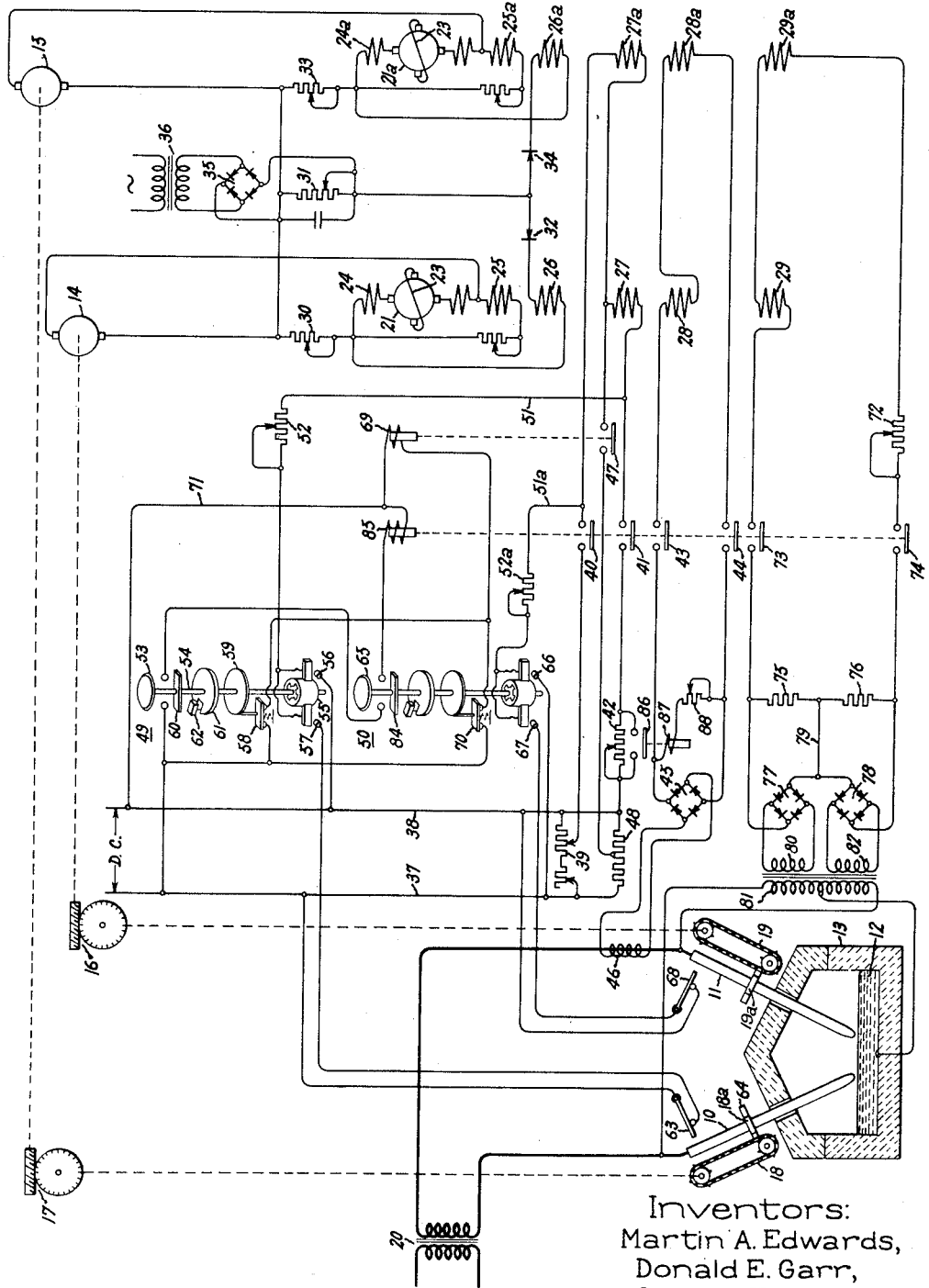
Inventors:
Martin A. Edwards,
Donald E. Garr,
George E. Shaad,
by Harry E. Dunham
Their Attorney.

Patented Aug. 1, 1944

2,354,911

UNITED STATES PATENT OFFICE 2,354,911

FURNACE CONTROL SYSTEM

Martin A. Edwards, Donald E. Garr, and George E. Shaad, Schenectady, N. Y., assignors to General Electric Company, a corporation of New York Application August 31, 1943, Serial No. 500,674

12 Claims. (Cl. 314—69)

Our invention relates to furnace control systems, more particularly to control systems for electrode furnaces, and has for its object a sensitive and dependable control system which may be operated as a fully automatic or as a manually controlled system.

This invention utilizes certain of the features described and claimed in a copending application Serial No. 480,824, filed on March 27, 1943, by Donald E. Garr and George E. Shaad for Furnace control system, assigned to the same assignee as this invention.

Our present invention is particularly applicable to the control of a single phase electrode furnace provided with two electrodes.

In carrying out our invention in one form, we raise and lower the electrodes by electric motors which are supplied with current by amplidyne generators having great amplification, as described in the aforesaid Garr and Shaad application. More particularly, we provide each of the amplidyne generators with five field windings which control the sensitivity of the amplidyne generator, limit the current that can be supplied by the generator to its motor, maintain a predetermined current in the furnace circuit and maintain equal voltage drops between the electrodes and the charge.

For a more complete understanding of our invention, reference should be had to the accompanying drawing, the single figure of which is a simplified diagram of a single phase arc furnace control system embodying our invention.

Referring to the drawing, we have shown our invention in one form as applied to the raising and lowering of two electrodes 10 and 11 with relation to a metal charge 12 contained in a suitable crucible 13. The two electrodes are raised and lowered by means of direct current motors 14 and 15 connected thereto by suitable gearings 16 and 17 and endless chain drives 18 and 19 to which the electrodes are secured by suitable clamps 18a and 19a. Alternating current is supplied to the electrodes from a suitable single phase transformer 20, suitable switches (not shown) being provided for the transformer. The motors, provided with separately excited direct current field windings (not shown), are supplied, respectively, with direct current from amplidyne generators 21 and 21a electrically connected to the motors. A suitable electric driving motor (not shown) is provided for each of the generators.

These generators 21 and 21a are of the armature reaction type having quick response and very high amplification, and are preferably of the type described and claimed in Patent No. 2,227,992, issued on January 7, 1941, to Ernst F. W. Alexanderson and Martin A. Edwards. Each generator has a set of output brushes which are connected to its electrode motor and a second pair of brushes which are permanently short-circuited through a conductor 23 and which are in quadrature relation with the current supply brushes. Also, the generators are supplied with series compensating field windings 24, 24a which substantially neutralize the armature reaction of the generator along the axis of the current supply brushes, together with five main field excitation windings 25, 25a to 29, 29a inclusive, which provide magnetic excitation along the axis of the current supply brushes. The field windings 24, 24a increase the sensitivity of the amplidynes by supplying excitation in the same direction as the main fields, but proportional to the current supplied to the motor 13.

The field windings 25, 25a are connected directly across the amplidyne armatures, through adjustable resistances, with polarities such as to tend to reduce the voltages of the generators. In other words, they oppose the combined effect of the other main field windings so as to give an anticipatory effect in the control and prevent hunting of the electrodes.

For the purpose of preventing damage to the driving mechanism, the field windings 26 and 26a are provided for limiting the current supplied to each of the motors and, therefore, limiting the torques of the motors. Thus when the electrodes are being moved downward into the furnace, engagement of an electrode with a solid charge or bottom of the furnace would result in full motor torque being applied to the electrode with possible breakage of the electrode and damage to the driving mechanism. The winding 26 is connected in a closed circuit including an adjustable resistor 30 in the circuit of its motor, an adjustable resistance 31 and a current valve 32 such as a copper oxide rectifier. Likewise, the field winding 26a is connected in series with an adjustable resistor 33 in its motor circuit, the resistor 31, and an electric valve 34.

A predetermined voltage is maintained across the resistor 31 of a polarity opposite to the polarity of the voltages across the resistors 30 and 33. This voltage is applied to the resistor 31 through a current rectifier 35 supplied by a transformer 36 from a suitable source of alternating current. As long as the fixed voltage across the resistor 31 is greater than that across the resistor 30 or 33, the electric valves 32 and 34 prevent any current flow through the field windings 26 and 26a. However, in case of a current in either motor circuit greater than a predetermined maximum value which produces a voltage drop across the resistor 30 or 33 greater than the voltage drop across the resistor 31, then a current flows through the field windings 26 or 26a in a direction to oppose the other field windings and lower the voltage of that particular generator until its current is lowered to the predetermined value.

The field windings 27, 27a and 28, 28a act primarily as current regulators for their respective electrode circuits. The field windings 27, 27a are supplied with a predetermined excitation current and normally are connected in series relation with each other across a suitable source of direct current supply 37, 38. Thus this circuit leads from an adjustable point on a load adjusting rheostat 39 through a switch 40, field windings 27a, 27, a switch 41 and an adjustable resistor 42 to the supply main 38. The field windings 27, 27a tend to maintain predetermined constant generator voltages. The field windings 28, 28a are connected also in series with each other and through switches 43 and 44 across a suitable current rectifier 45 which may be a copper oxide rectifier as shown. This rectifier is in turn connected across a current transformer 46 in circuit with one of the electrodes so that a voltage is applied to the field windings 28 and 28a which is proportional to the current in the electrode circuit. The field windings 28, 28a oppose, respectively, the field windings 27, 27a and thereby operate to maintain a predetermined electrode current which matches the current in the field windings 27, 27a determined by the adjustment of the resistor 39. Thus, if the electrode current is lower than the desired current, the excitation of the windings 28, 28a is reduced correspondingly and the windings 27, 27a produce voltages in the amplidyne generators in a direction to lower the electrodes and increase the current.

Also, the fields 27, 27a are used for manual operation of the electrodes. These fields are then connected through a switch 47 to a midpoint on a reactor shown as a resistor 48 connected across the direct current supply mains 37, 38. By means of manually operated control switches 49 and 50, the other terminals of the windings 27, 27a may be connected respectively through conductors 51, 51a and adjustable resistors 52, 52a to one side or the other of the direct current supply source for appropriate polarity energization of the field windings for raising or lowering of the electrodes.

The two control switches 49 and 50, which are identical in construction, will now be described briefly with particular reference to switch 49. It will be understood that these control switches are shown diagrammatically and that any suitable control switch may be used. By means of a knob 53 on a shaft 54 the contact supporting member 55 splined on the shaft may be turned in one direction or the other to close one or the other of the switches 56 and 57. Also, when the knob and shaft are in their lowermost positions, as shown, a switch 58 is held closed by a disc member 59, regardless of the direction in which the shaft is turned. In this position, also, of the shaft a switch 60 is opened. By pulling outward or lifting the knob 53 and shaft, the switch 60 may be closed, the switch 58 opened, and the switches 56 and 57 maintained open. These two latter switches are maintained open because the knob must be turned to an intermediate position before it can be pulled out in order to register a notch in the disc 61 with a fixed projection 62. This latching arrangement for the shaft prevents turning of the shaft after it has been pulled out to close the switch 60 so that neither one of the switches 56 or 57 can be closed at that time.

Thus in the control of the field winding 27, the handle 53 will be pushed downward to the position shown and turned to close either the switch 56 or the switch 57, whereby the lower end of the winding is connected through the conductor 51 and adjustable resistance 52 to one side or the other of the D. C. supply source. Closure of the switch 56 energizes the field winding 27 in a direction to lower its electrode 10 while closure of the switch 57 reverses the energization of the field winding 27 and causes raising of the electrode 10. It will be noted that this latter connection of the field winding leads through a limit switch 63 which is opened by a projection 64 carried by the electrode 10 when the electrode has been raised to a predetermined point whereby the field windings are deenergized and the raising stopped.

By turning the knob 65 of the control switch 50 in one direction or the other in its lowermost position shown, one of the other switches 66 or 67 may be closed thereby to energize the field winding 27a for raising or lowering of the electrode 11. A limit switch 68 is provided to limit the raising of the electrode 11 to a predetermined height.

It will be observed that the switch 47 was closed to provide for this manual operation of the electrodes by energization of its coil 69 from the D. C. supply source through either the switch 58 or the corresponding switch 70 on the control switch 50. One side of the coil 69 is connected directly to one side of the direct current supply source through a conductor 71.

The two remaining voltage balance field windings 29, 29a act to maintain a balance in the voltages between the two electrodes and the charge. These two field windings are connected differentially in series with each other through an adjustable resistor 72 and the terminals of this circuit are connected through switches 73 and 74 across two resistances 75 and 76, which in turn are connected to suitable current rectifiers 77 and 78, shown as copper oxide rectifiers. A connection 79 is provided connecting together the points between the two resistors and the two rectifiers. The rectifier 77 is connected to a secondary winding 80 of a transformer whose primary 81 is connected across the electrode 10 and the charge while the rectifier 78 is similarly connected through the transformer windings 82 and 83 across the electrode 11 and the charge.

When the voltages across the two resistors 75 and 76 are equal, no voltage appears across the two resistors because they are connected so that their voltages oppose each other. The field windings 29, 29a are therefore not energized under these conditions. However, when one electrode for any reason becomes nearer the charge than the other, as by unequal movement or burning away of the electrodes, the voltage across its resistor 75 or 76 becomes lower than the voltage across the other resistor whereby a current is caused to flow through the field windings 29, 29a. The field windings 29, 29a are connected to excite their generators in opposite senses so as to cause the electrode motors to operate to raise the lowermost electrode and lower the other electrode until a voltage balance is restored across the two arcs.

The voltage balance field windings 29, 29a perform an important function when the electrodes are moving down on a new charge in the furnace. If, for instance, electrode 11 should strike the charge before the electrode 10, the voltage across the transformer winding 83 and resistor 76 goes to zero thus stopping the movement of the electrode 11 and causing the electrode 10 to lower at a very rapid rate. Therefore, the two electrodes come to an operating position into engagement with the charge more rapidly than they otherwise would. It will be noted that the field windings 28, 28a are not energized until the furnace circuit is established through the charge.

For automatic operation of the furnace the two knobs 53 and 65 are pulled outward or upward, after first being turned to their intermediate positions, as shown, thereby to close the switches 60 and 84, the remaining switches of these two control switches being open. The switches 60 and 84 are in series with each other and close a circuit for the operating coil 85 for the switches 40, 41, 43, 44, 73, and 74, whereby all these switches are closed. This circuit for the coil leads from the conductor 71 through coil 85, the switch 84, and the switch 60 to the opposite side of the D. C. supply source. At this time the coil 69 is deenergized and, consequently, the switch 47 is open. The system now operates automatically in the manner previously described to limit the torque of the motors, maintain a predetermined electrode current for which the resistance 39 is adjusted, and maintain equal arc voltages.

At the beginning of the operation of the furnace under automatic control, it is assumed that the electrodes will be in a raised position out of contact with the charge. Under these conditions, of course, no current flows in the electrodes and therefore the switch 86 is open so that all of the resistance 42 is inserted in circuit with the field windings 27, 27a for low energization of these field windings and a correspondingly slow lowering speed of the electrodes. When the electrodes strike the charge, however, the switch 86 is closed by energization of its coil 87 which is connected through an adjustable resistance 88 across the rectifier 45. This increases the energization of the field windings 27, 27a for normal maximum speed of adjustment of the electrodes.

Either one of the electrodes can be operated manually by operation of its control switch 49 or 50. It will be observed that when one or the other of the knobs 53 and 65 is pressed downward or inward, the switch 60 or 84 is opened thereby to deenergize the coil 85 and open the switches 40, 41, 43, 44, 73 and 74 for discontinuance of automatic operation of both electrodes.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

What we claim as new and desire to secure by Letters Patent in the United States is:

1. A control system for an electric furnace provided with two movable electrodes comprising a motor for moving each of said electrodes, current supply means for each of said motors for supplying current to each of said motors for movement of said electrodes, a first control means for each of said supply means for causing each of said supply means to supply current to its said motor for operating said motor to lower its electrode, a second control means for each of said supply means responsive to the current in the corresponding electrode for controlling said supply means to cause said motors to adjust said electrodes to maintain predetermined currents in said electrodes, a manually operated control device for each of said motors, switching means operated by each of said control devices to deenergize said first and second control means for both of said supply means, and switching means operated by movement of each of said control devices for energizing selectively said first control means for its corresponding motor for manual control of the corresponding electrode.

2. A control system for a furnace provided with two movable electrodes comprising a motor for moving each of said electrodes, current supply means for supplying current for each of said motors, a first control means for each of said current supply means for causing said supply means to supply a predetermined voltage, a second control means for said supply means responsive to the current in the circuit of said electrodes for controlling said supply means in opposition to said first control means thereby to maintain a predetermined current in said electrode circuit, a pair of manually operated control devices movable to predetermined positions to effect the energization of said second control means in response to the current in the circuit of said electrodes, and switching means operated by movement of one of said control devices to another position for deenergizing said second control means and for energizing said first control means for the corresponding one of said supply means for manual control of the corresponding electrode.

3. A control system for a furnace provided with two movable electrodes comprising a motor for moving each of said electrodes, a generator for supplying current for each of said motors, a first field control means for said generators for exciting said generators to a predetermined constant value, a second field control means for said generators responsive to the current in the circuit of said electrodes for controlling the excitation of said generators in opposition to said first field control means thereby to maintain a predetermined current in said electrode circuit, a pair of manually operated control devices movable to predetermined positions to effect the energization of said second field control means in response to the current in the circuit of said electrode, and switching means operated by movement of one of said control devices to another position for deenergizing said second field control means and for energizing said first field control means for the corresponding one of said generators for manual control of the corresponding electrode, and means responsive to the current in each of said generators for exciting said generators in opposition to said first field control means upon the occurrence of a predetermined current in said generator thereby to limit the current in said generator.

4. A control system for a furnace provided with two movable electrodes comprising a motor for moving each of said electrodes, current supply means for supplying current to each of said motors, voltage control means for each of said supply means, connections for supplying a predetermined current to said voltage control means, connections for energizing said voltage control means in response to the current in the circuit of said electrodes in opposition to said predetermined current thereby to maintain a predetermined current in said electrode circuit, a second voltage control means for each of said current supply means, means for energizing each of said voltage control means in response to the voltage between its electrode and a charge, said second voltage control means being differentially arranged with respect to each other thereby to produce a joint adjustment of said electrodes for equalization of said voltages, a manually operated control switch for controlling the manual energization of each of said first voltage control means for manual control of each of said electrodes, and switching means jointly controlled by said two control devices for deenergizing said second voltage control means when either one of said control devices is operated to energize its first voltage control means.

5. A control system for a furnace provided with two movable electrodes comprising a motor for moving each of said electrodes, a generator for supplying current for each of said motors, a first field control means for said generators for exciting said generators to a predetermined constant value, a second field control means responsive to the current in the circuit of said electrodes for exciting said generators in opposition to said second field control means thereby to maintain a predetermined current in said electrode circuit, and a third field control means for exciting said generators for differential operation of said motors in response to the voltages between each of said electrodes and a charge thereby to maintain said voltages substantially equal to each other, a pair of manually operated control devices operable to predetermined positions to effect the energization of said field control means for automatic control of said electrodes, and means operated by movement of one of said control devices to another position for deenergizing said field control means and for energizing said first field control means for one of said generators for manual movement of the corresponding electrode.

6. A control system for a furnace provided with at least two movable electrodes comprising a motor for moving each of said electrodes, a generator for supplying current to each of said motors, a first normally deenergized field winding for each of said generators, means for energizing each of said first field windings upon the occurrence of a current in its generators greater than a predetermined maximum current in a direction to decrease the field excitation of its generator, a second field winding for each of said generators, connections for supplying a predetermined current to each of said second field windings, a third field winding for each of said generators, connections for energizing said third field windings in response to the current in the circuit of said electrodes and in directions opposing said second field windings thereby to maintain a predetermined current in said electrode circuit, a fourth field winding for each of said generators, means for energizing each of said fourth field windings in response to the voltage between its electrode and a charge, said fourth field windings being differentially arranged with respect to each other thereby to produce a joint adjustment of said electrodes for equalization of said voltages, a manually operated control device for controlling the energization of each of said second field windings for manual control of each of said electrodes, and switching means jointly controlled by said two control devices for deenergizing said third and fourth field windings when either one of said control devices is operated to energize its second field winding.

7. A control system for a furnace provided with at least two movable electrodes comprising a motor for raising and lowering each of said electrodes, a generator connected to each of said motors for supplying current thereto, a first field winding for each of said generators, direct current supply connections for said first field windings, connections for connecting said first field windings in series with each other to said direct current supply connections to supply a predetermined current to both of said field windings, a second field winding for each of said generators, current responsive means responsive to the current in the circuit of said electrodes, connections for connecting said second field windings in series with each other to said current responsive means thereby to energize said second field windings in opposition to said first field windings so as to maintain a predetermined current in said electrode circuit, a manually operated control device for each of said electrodes, a normally open disconnecting switch means in each of said series connected field winding circuits, means responsive to the operation of both of said control devices to predetermined corresponding positions for closing said disconnecting switch means for automatic operation of the furnace, said disconnecting switch means being opened by movement of either of said control devices to a second position, switching means operated by movement of each of said control devices to its second position for partially completing a circuit for the corresponding one of said first field windings, and additional switching means operated by each of said control devices in said other position for controlling the direction of energization of its said first field winding for raising or lowering of the corresponding electrode.

8. A control system for a furnace provided with at least two movable electrodes comprising a motor for moving each of said electrodes, a generator connected to each of said motors for supplying current thereto, a first field winding for each of said generators, direct current supply connections for said field windings, connections for connecting said field windings in series with each other across said direct current supply connections thereby to supply a predetermined current to both of said field windings, said connections including a normally open first disconnecting switch means, a manually operated control device for each of said electrodes, means responsive to operation of both of said control devices to predetermined corresponding positions for closing said first disconnecting switch means for automatic control of said electrodes, said first disconnecting switch means being opened to deenergize said field windings upon movement of either one of said control devices to a second position, switching means operated by movement of each of said control devices after movement to its said second position for connecting its corresponding field winding to said supply connections for movement of the corresponding electrode, a second field winding for said generators, current responsive supply means responsive to the current in the circuit of said electrodes, a second normally open disconnecting switch means for connecting said second field windings to said current responsive supply means, and connections between said first and second disconnecting switch means for simultaneous operation thereof between their closed and open circuit positions.

9. A control system for a furnace provided with at least two movable electrodes comprising a motor for raising and lowering each of said electrodes, a generator of the armature reaction type connected to each of said motors for supplying current thereto, a field winding for each of said generators, direct current supply connections for said field windings, connections for connecting said field windings in series with each other across said direct current supply connections thereby to supply a predetermined current to both of said field windings, said connections including a normally open first disconnecting switch means, a reactance device connected across said supply connections, a connection including a second disconnecting switch means between an intermediate point of said reactance and a point between said two field windings, a manually operated control device for each of said electrodes, means responsive to the operation of both of said control devices to predetermined corresponding positions for closing said first disconnecting switch means for automatic control of said generators and motors, said first disconnecting switch means being opened to deenergize said field windings upon movement of either one of said control devices to a second position thereby to provide for manual control of one of said electrodes by said control device, means operated by movement of either one of said control devices to said second position for closing said second disconnecting switch means for connection of one end of each of said field windings to said intermediate point of said reactor, switching means operated by movement of each of said control devices in one direction or the other after movement to said second position for connecting the other terminals of said field windings respectively to one or the other of said direct current supply connections for energization of said field windings to effect raising or lowering of one or the other of said electrodes, means responsive to the current in the circuit of said electrodes for supplying field excitation to said generators in opposition to the field excitation supplied by said first field windings, normally open disconnecting switch means operated by said first disconnecting switch means in circuit with said field excitation means.

10. A control system for a furnace provided with at least two movable electrodes comprising a motor for raising and lowering each of said electrodes, a generator of the armature reaction type connected to each of said motors for supplying current thereto, a field winding for each of said generators, direct current supply connections for said field windings, connections for connecting said field windings in series with each other across said direct current supply connections thereby to supply a predetermined current to both of said field windings, said connections including a normally open first disconnecting switch means, a reactance device connected across said supply connections, a connection including a second disconnecting switch means between an intermediate point of said reactance and a point between said two field windings, a manually operated control device for each of said electrodes, means responsive to the operation of both of said control devices to predetermined corresponding positions for closing said first disconnecting switch means for automatic control of said electrodes, said first disconnecting switch means being opened to deenergize said field windings upon movement of either one of said control devices to a second position thereby to provide for manual control of one of said electrodes by said control device, means operated by movement of either one of said control devices to said second position for closing said second disconnecting switch means for connection of one end of each of said field windings to said intermediate point of said reactor, switching means operated by movement of each of said control devices in one direction or the other after movement to said second position for connecting the other terminals of said field windings respectively to one or the other of said direct current supply connections for energization of said field windings to effect raising or lowering of one or the other of said electrodes, field excitation means responsive to the current in the circuit of said electrodes for supplying field excitation to said generators in opposition to the field excitation of said field windings, normally open disconnecting switch means operated by said first disconnecting switch means in circuit with said field excitation means, and means responsive to the current in each of said generators for exciting said generators in opposition to said first field windings upon the occurrence of a predetermined current in the generator circuit thereby to limit the current in said generator circuit.

11. A control system for a furnace provided with at least two movable electrodes comprising a motor for raising and lowering each of said electrodes, current supply means connected to each of said motors for supplying current thereto, voltage control means for each of said supply means, direct current supply connections for said voltage control means, current responsive means responsive to the current in the circuit of said electrodes connected to energize said voltage control means in opposition to said direct current supply so as to maintain a predetermined current in said electrode circuit, a second voltage control means for each of said generators, voltage responsive means responsive to the voltages across each of said electrodes and a charge, connections connecting said second voltage control means in series with each other and to said voltage responsive means to energize said second voltage control means differentially with respect to each other in accordance with the amount and direction of the difference between said voltages thereby to produce a joint adjustment of said electrodes for equalization of said voltages, a manually operated control device for each of said electrodes, normally open disconnect switch means in the circuits of said voltage control means, means responsive to the operation of both of said control devices to predetermined corresponding positions for closing said disconnect switch means for automatic operation of said furnace, said disconnect switch means being opened by movement of either of said control devices to a second position for manual control of one of said electrodes, switching means operated by movement of either one of said control devices to said second position for partially completing a circuit for the corresponding one of said first voltage control means, and additional switching means operated by each of said control devices in said other position for controlling the direction of energization of its corresponding first voltage control means from said supply connection thereby to raise or lower its corresponding electrode.

12. A control system for a furnace provided with at least two movable electrodes comprising a motor for raising and lowering each of said electrodes, an armature reaction type generator connected to each of said motors for supplying current thereto, a self-excited anti-hunt first field winding connected across each of said generators, a second normally deenergized field winding for each of said generators, means for energizing each of said second field windings upon the occurrence of a current in its generator greater than a predetermined value in a direction to decrease the field excitation of its generator, a third field winding for each of said generators, direct current supply connections for said third field windings, connections for connecting said third field windings in series with each other to said direct current supply connections to supply a predetermined current to each of said third field windings, a fourth field winding for each of said generators, current responsive means responsive to the current in the circuit of said electrodes, connections for connecting said fourth field windings in series with each other and to said current responsive means thereby to energize said fourth field windings in opposition to said third field windings so as to maintain a predetermined current in said electrode circuit, a fifth field winding for each of said generators, voltage responsive means responsive to the voltages across each of said electrodes and a charge, connections connecting said fifth field windings in series with each other and to said voltage responsive means thereby to energize said field windings differentially with respect to each other in accordance with the amount and direction of the difference between said voltages thereby to produce a joint adjustment of said electrodes for equalization of said voltages, a manually operated control device for each of said electrodes, normally open disconnect switch means in the circuits of said third, fourth and fifth field windings, means responsive to the operation of both of said control devices to predetermined corresponding positions for closing said disconnect switching means for automatic operation of said furnace, said disconnect switches being opened by movement of either of said control devices to a second position for manual control of one of said electrodes, switching means operated by movement of either one of said control devices to said second position for partially completing a circuit for the corresponding one of said third field windings, and additional switching means operated by each of said control devices in said other position for controlling the direction of energization of its corresponding third field winding thereby to raise or lower its corresponding electrode.

MARTIN A. EDWARDS.
DONALD E. GARR.
GEORGE E. SHAAD.